Jan. 12, 1960     H. HINRICHSEN ET AL     2,920,906
TRAILER JACK AND MOBILE SUPPORT
Filed July 31, 1957                             3 Sheets-Sheet 2
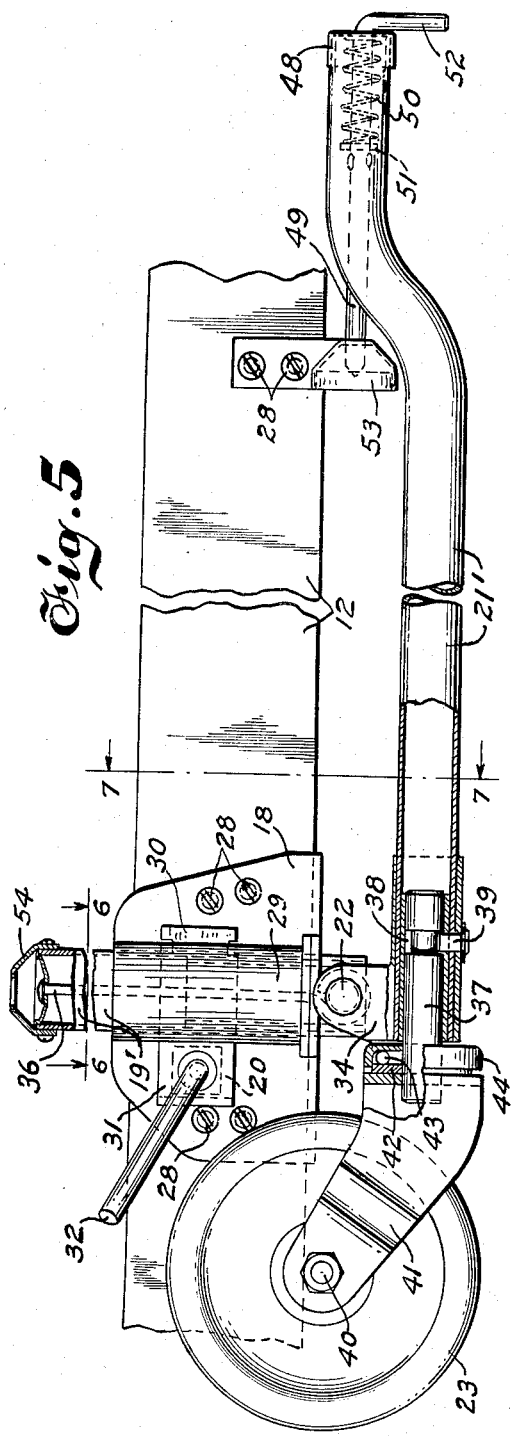
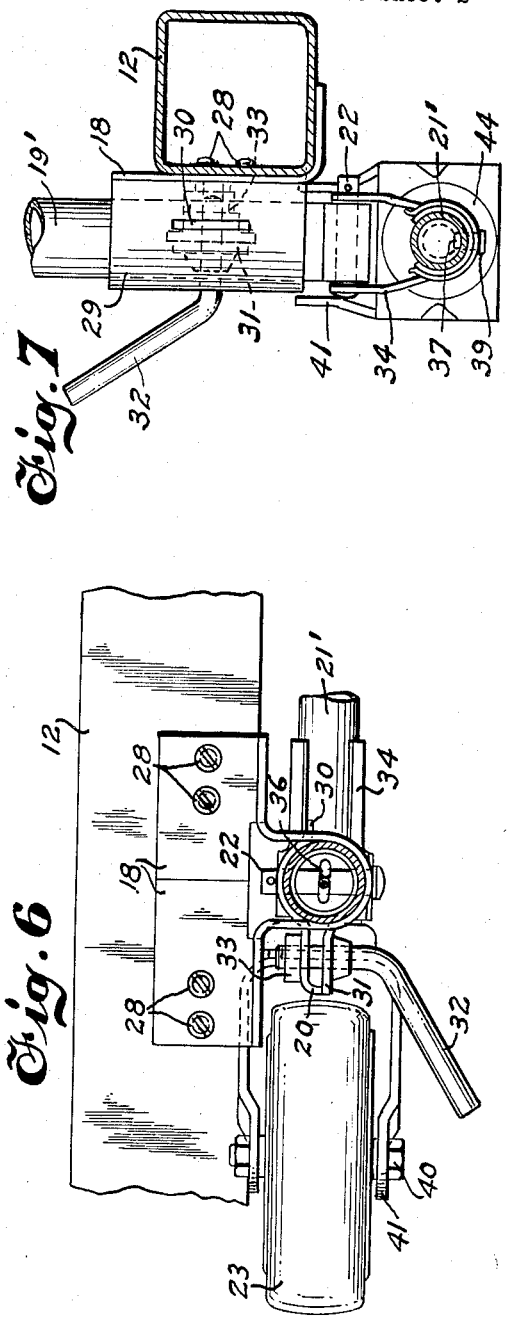
INVENTORS
H. Hinrichsen
BY B. R. Weber
Lieber & Lieber
ATTORNEYS.

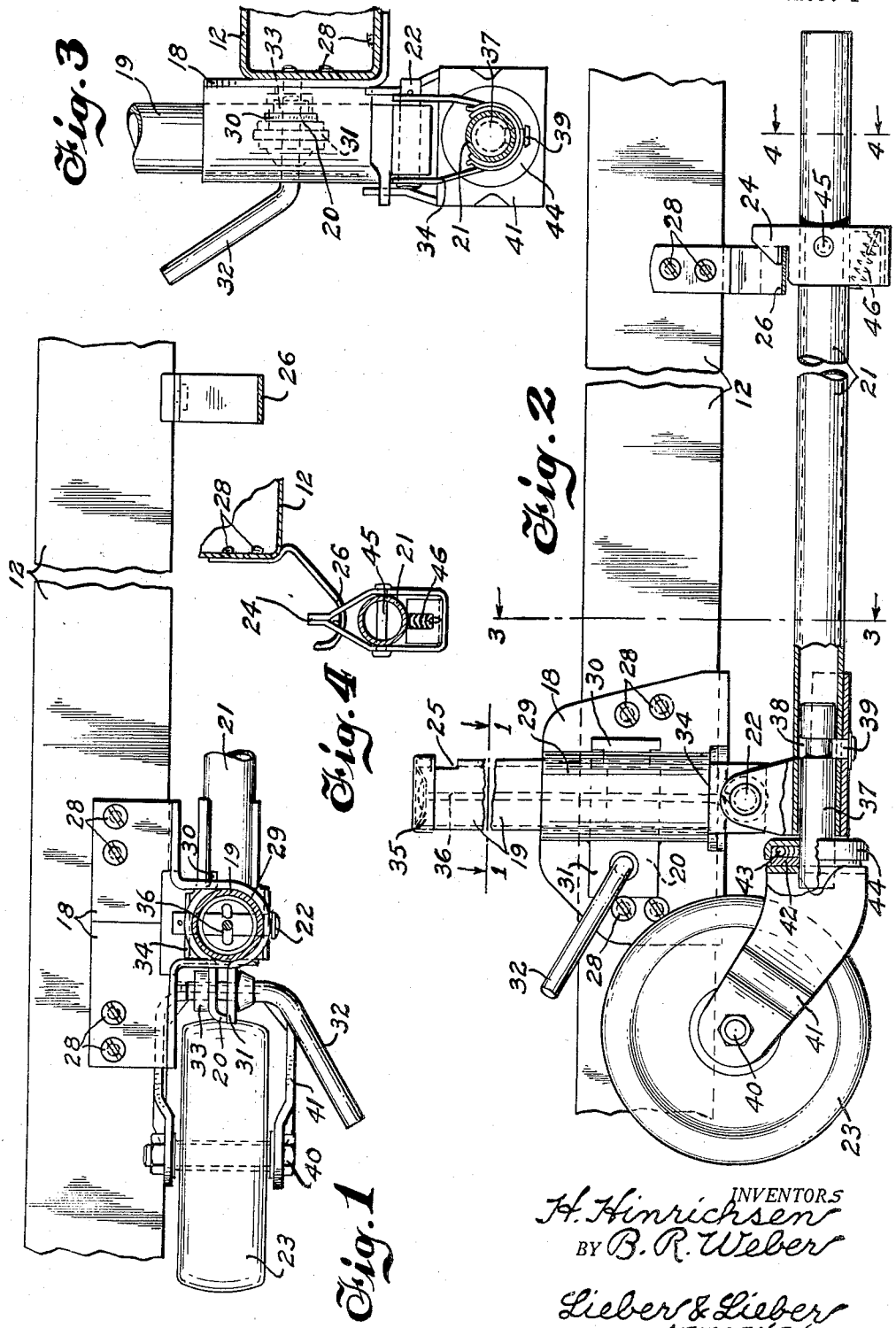

Patented Jan. 12, 1960

2,920,906

TRAILER JACK AND MOBILE SUPPORT

Hans Hinrichsen, West Allis, and Bernard R. Weber, Wauwatosa, Wis., assignors to The Fulton Company, West Allis, Wis., a corporation of Wisconsin Application July 31, 1957, Serial No. 675,367

10 Claims. (Cl. 280—475)

This invention relates generally to improvements in apparatus for facilitating the handling of vehicle trailers, and it relates more specifically to improvements in the construction and operation of devices for facilitating the coupling and uncoupling of vehicle drawn trailers and the movement thereof when detached from the draft vehicle.

The primary object of the present invention is to provide an improved trailer jack and mobile support which is simple in construction and readily manipulable.

When utilizing a ball and socket type coupling to attach a trailer to a hauling vehicle, it is frequently desirable to be able to promptly lift the socket member of the coupling carried by the trailer tongue away from the ball member attached to the propelling vehicle when these members have been released, and to thereafter manually transport the trailer away from the towing vehicle. While various types of equipment for uncoupling trailers from draft vehicles and for subsequently maintaining the detached trailers in normal or approximately horizontal position, have heretofore been proposed and use commercially, none of these prior devices were adapted to effectively perform the multiple functions of facilitating the coupling and uncoupling operations, of enabling convenient movement of the uncoupled trailer from place to place, and of maintaining the released trailer in normal or desired position while at rest.

It is therefore an important object of our invention to provide an improved assemblage adapted to perform all of the above mentioned functions, without in any manner obstructing the normal transportation of the trailer by a draft vehicle.

Another important object of this invention is to provide a compact, durable and readily manipulable appliance attachable to various types of trailer draft tongues to effect rapid attachment or detachment of the trailer relative to a hauling vehicle.

A further important object of the invention is to provide an improved safely operable mechanism for handling a trailer after it has been uncoupled or disconnected from a towing automobile or the like.

Still another important object of the present invention is to provide a sturdy jack and mobile support for a trailer draft tongue, which is flexible in its adaptations and capable of being readily installed and manipulated by a novice.

An additional important object of this invention is to provide a combined jack and manipulating unit for vehicle drawn trailers, which can be manufactured at moderate cost primarily of durable sheet metal and applied to various types of trailers.

These and other more specific objects and advantages of the invention will be apparent from the following detailed description.

A clear conception of the features constituting the present improvement, and of the construction and functioning of several types of practical trailer jack and mobile supporting units embodying the invention, may be had by referring to the drawings accompanying and forming a part of this specification in which like reference characters designate the same or similar parts in the various views.

Fig. 1 is a fragmentary part sectional top view of one embodiment of the invention showing the device attached to a trailer draft tongue and elevated into inactive position, the section having been taken along the line 1—1 of Fig. 2;

Fig. 2 is a fragmentary and part sectional side elevation of the unit shown in Fig. 1, showing the same latched into inactive position and the section having been taken centrally and vertically through the medial portion of the main jack and maneuvering lever;

Fig. 3 is a transverse vertical section through the assemblage of Fig. 2 taken along the line 3—3, with the top portion of the upright strut broken away;

Fig. 4 is another transverse vertical section through the latching end only of the main lever taken along the line 4—4;

Fig. 5 is a fragmentary part sectional side elevation of a modified embodiment of the invention, showing the device applied and in inactive position relative to a trailer draft tongue, and the section having been taken vertically and centrally through the upper end of the strut and the medial portion of the main manipulating lever;

Fig. 6 is a fragmentary transverse section and top view of the unit shown in Fig. 5, the section having been taken along the line 6—6;

Fig. 7 is a transverse vertical section through the assemblage of Figs. 5 and 6, the section having been taken along the line 7—7 of Fig. 5, and the top of the upright strut being broken off;

While the invention has been shown and described herein as having been applied to a trailer having a tongue adapted to be attached to the rear of an automobile by means of a ball and socket coupling, it is not intended to restrict the use of the improved features to such an assemblage, and it is also contemplated that specific descriptive terms employed herein be given the broadest possible interpretation consistent with the actual disclosure.

Figure 8:
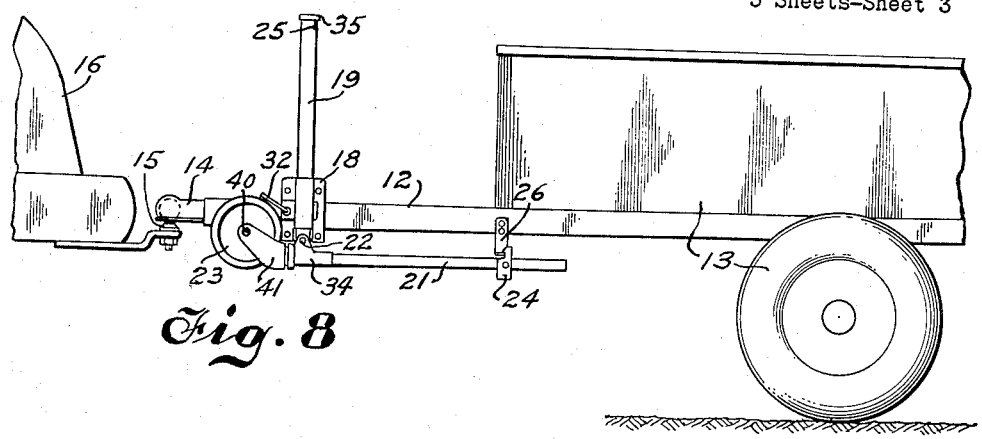
Fig. 8 is a diagram showing a typical trailer coupled to an automobile by means of a ball and socket coupling, and having one of the present improved units of the type shown in Figs. 1 to 4 inclusive applied to the trailer draft tongue and in inactive or elevated condition.
Figure 9:
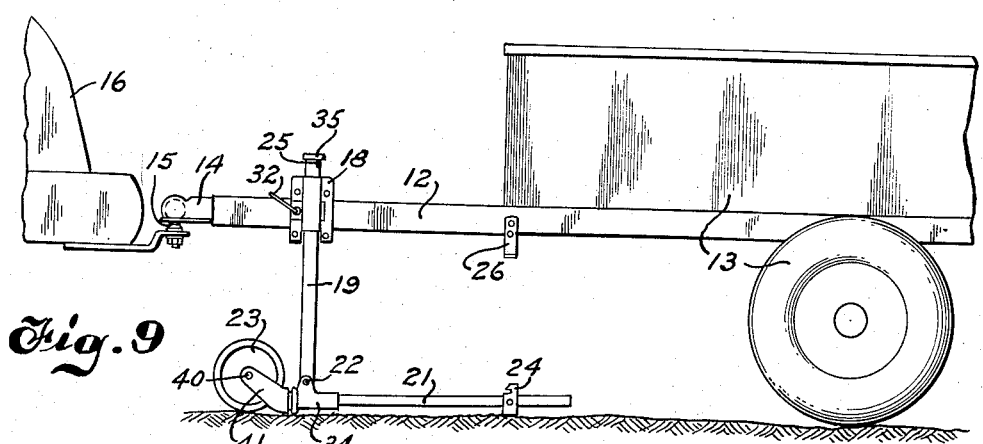
Fig. 9 is a similar diagram of the same assemblage but showing the strut and main lever lowered into ground engagement.
Figure 10:
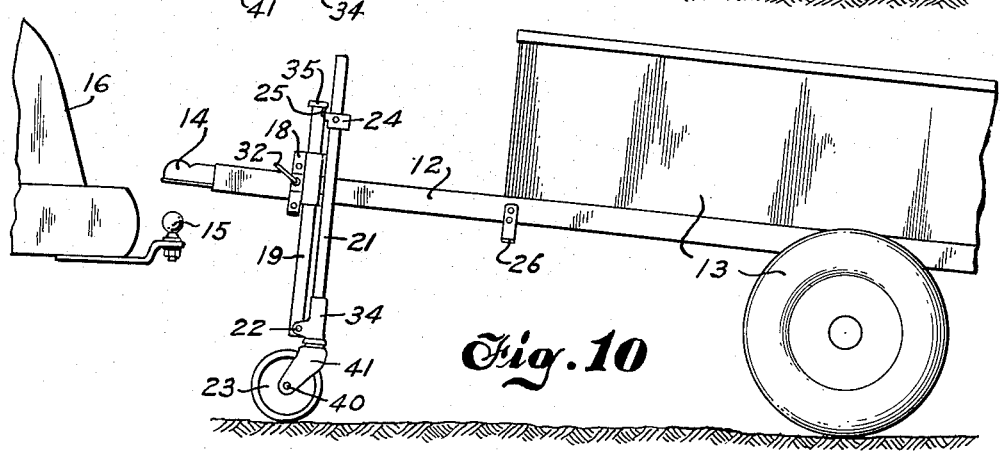
Fig. 10 is another similar diagram of the assemblage showing the device after having been manipulated to raise and support the tongue while uncoupling the trailer from the draft vehicle.

Referring to the drawings, the improved trailer jack and mobile support shown therein is adapted to be mounted upon the polygonal or round sectioned metal draft tongue 12 of various types of trailers 13, and having thereon a socket coupling member 14 detachably cooperable with a ball coupling member 15 secured to the rear of a pulling vehicle or automobile 16 as illustrated in the diagrams of Figs. 8, 9 and 10. These ball and socket couplings are of well known construction and are provided with a releasable ball retainer which when released permits the socket member 14 to be lifted freely off of the ball member 15.

As illustrated in Figs. 1 to 4 inclusive, the improved appliance depicted therein comprises in general, an angle bracket 18 mountable upon the trailer draft tongue 12 rearwardly of its socket coupling member 14; an elongated strut 19 slidable longitudinally in a generally vertical direction within the bracket 18; a clamp 20 for holding the strut 19 in various positions relative to the bracket 18; a main lever 21 suspended by a medial fulcrum pin 22 from the lower end of the strut 19 and being provided near one end with a ground engaging caster wheel 23 and at its opposite manipulating end portion with a latch 24; a latch engaging retainer notch 25 formed on the upper end of the strut 19; and an alternate latch engaging retainer 26 secured to the trailer tongue 12 remote from the strut 19.

The bracket 18 is preferably formed of sturdy sheet metal with integral attaching flanges adapted to be rigidly secured to the tongue in any suitable manner as with screws 28, and the upright side wall of this angle bracket is provided with an integral substantially semi-cylindrical guide 29 within which the strut 19 is vertically slidable whenever the clamp 20 is released. The clamp 20 is also preferably formed of durable but resilient sheet metal and extends transversely through the guide 29 so that one protruding end 30 thereof acts as a fulcrum while its medial portion is curved to clampingly engage the strut 19 and its opposite protruding end coacts with an integral projection 31 on the guide 29 and is adapted to be clamped thereto by a handle 32 having screw thread coaction with a threaded collar 33 secured to this opposite clamp end, as shown in Fig. 1.

The vertically slidable strut 19 may be formed of strong sheet metal tubing and has the pivot pin 22 extending transversely through its lower extremity; while its upper end is provided with the retainer notch 25 and has a sheet metal closure cap 35 secured thereto in any suitable manner. As shown in Figs. 1 and 2, this cap is fastened to the tubular strut 19 by means of a wire 36 disposed coaxially of the tube and one end of which is fastened to the cap 35 while its lower end is looped about the pivot pin 22. The main lever 21 is also formed of durable sheet metal tube stock, and is provided at its medial fulcrum portion with a rigidly attached bracket 34 having projecting ears coacting with the opposite ends of the pivot pin 22, and the pivot shaft 37 of the caster wheel 23 is journalled for free rotation within the tubular lever 21 and has an annular recess 38 therein engaged by a retainer pin 39 as shown in Fig. 2.

The caster wheel 23 is journalled for free rotation about an axle 40 carried by a sheet metal fork 41 which is secured to the outer end of the pivot shaft 37, and a bearing plate 42 which snugly embraces the shaft 37 and engages the fork 41 coacts with ball bearings 43 which react against a ball confining cup 44 loosely embracing the shaft 37 near the end of the tubular lever 21. The caster wheel fork 41 and shaft 37 constitute a part of the lever 21 at one side of its fulcrum pivot 22, and the portion of this lever on the opposite side of its fulcrum and to which the latch 24 is rockably secured by a pin 45 provides a manipulating handle for the lever 21. The latch 24 is also formed of sheet metal and is constantly biased to swing in a counter-clockwise direction as viewed in Fig. 2, by a suitable spring 46, and the retainer 26 which is also firmly secured to the trailer draft tongue 12 by means of screws 28 or otherwise, is likewise formed of sheet metal.

During normal use of the improved device, when the lever 21 and caster wheel 23 are in inactive position as in Figs. 2 and 8, and the strut 19 has been raised and clamped in uppermost position by means of the clamp 20, the latch 24 will engage the retainer 26 and hold the lever 21 substantially parallel to and adjacent the trailer draft tongue 12. However, if the latch 24 is released from the retainer 26 and the clamp 20 is also released, the strut 19 will slide downwardly by gravity until both the lever 21 and the caster wheel 23 engage the ground on opposite sides of the strut as depicted in Fig. 9, and the strut 19 will then be free to rotate about its own axis. In order to thereafter release the coupling socket member 14 from the ball member 15, it is only necessary for the operator to release the ball and to fasten the clamp 20, whereupon he can grasp the handle of the lever 21 and elevate the same. The caster wheel will then be swung downwardly about the pivot pin 22 and will raise the previously released socket member 14 away from the ball member 15 as in Fig. 10.

With the coupling members 14, 15 thus separated, the forward end of the trailer tongue 12 will be supported by the strut 19 and caster wheel 23, and the lever 21 may thereafter be swung about the pivot pin 22 until the latch 24 snaps into engagement with the retainer opening 25. The caster wheel 23 will then be free to revolve about the central axis of the shaft 37 and lever 21 so that the trailer 13 may be manually transferred to any desired location, and may finally be brought into horizontal or other desirable position by releasing the clamp 20 and moving the tongue 12 down or up relative to the strut 19. In order to again couple the trailer 13 to the vehicle 16, it is only necessary to reverse the procedure and to restore the parts to the positions shown in Fig. 8 so that the improved unit will be firmly held closely adjacent to the trailer tongue 12 and will not in any manner interfere with subsequent transportation of the trailer 13 by the automobile 16.

The modified trailer jack and mobile support shown in Figs. 5, 6 and 7 is quite similar in structure and operation as that herein above described, except for the formation of the main lever 21' and of the retainers for holding this lever in horizontal and upright positions. In this modification, the lever 21' is also formed of durable sheet metal tube stock but is off-set near its swinging end remote from the pivot pin 22 and bracket 34. This off-set end of the lever 21' is provided with a cap 48 in which a latch pin 49 is slidably confined by a compression spring 50 which coacts with an abutment 51 secured to the pin 49 and reacts against the cap 48, as shown in Fig. 5. One end of the pin 49 is provided with a handle 52 while its opposite end is latchingly cooperable either with a cup-shaped retainer 53 secured to the trailer draft tongue 12, or with a similar cup-like retainer 54 fastened to the upper extremity of the strut 19'. The remaining elements of the modified unit are substantially the same as the corresponding elements of the assemblage shown in Figs. 1 to 4 inclusive, and the operation of the modified device is also the same as depicted in Figs. 8 to 10 inclusive.

From the foregoing detailed description of the construction and mode of utilizing the improved device it will be apparent that the invention in fact provides a simple but highly efficient unit for coupling and uncoupling a trailer relative to a hauling vehicle, and for facilitating manual movement of the trailer when disconnected from the vehicle. The improved assemblage is especially useful in effecting release and interconnection of couplings of the ball and socket type wherein the members are separable by lifting the socket member off of the ball member, and the same caster wheel which is used to lift the trailer tongue also sustains this tongue while the trailer is being transported manually. The device can be quickly, easily and safely manipulated by a novice, and readily attached as an accessory to various types of trailer draft tongues or bars, and has proven highly satisfactory and successful in actual use.

It should be understood that it is not intended to limit this invention to the exact details of construction and operation of the coupling and trailer manipulator herein specifically shown and described, for various modifications within the scope of the appended claims may occur to persons skilled in the art.

We claim:

1. In a jack and mobile support for a trailer having a tongue provided with a coupling member detachably attachable to another coupling member carried by a hauling vehicle, a bracket mountable upon the trailer tongue, an elongated strut slidable up and down within said bracket, clamp means for locking said strut to said bracket, a lever having a fulcrum coacting with a lower portion of said strut and being provided near one end with a wheel and near its opposite end with a latch, and separate latch retainers carried by an upper portion of said strut and by the trailer remote from said bracket, said lever being alternately swingable about its fulcrum to cause said latch to coact with said strut carried retainer when the lever swings said wheel into ground engagement and to cause the same latch to coact with said trailer carried retainer when the strut and wheel are elevated.

2. In a jack and mobile support for a trailer having a draft tongue provided with a coupling member detachably attachable to another coupling member carried by a hauling vehicle, a bracket mountable upon the trailer draft tongue, an elongated strut reciprocable vertically relative to said bracket, clamp means for locking said strut to said bracket, a lever having a fulcrum pivot suspended from a lower portion of said strut and being provided near one end with a ground engaging wheel and near its opposite end with a latch, a latch retainer carried by an upper portion of said strut, and another latch retainer carried by the trailer tongue remote from said bracket, said lever being swingable about its fulcrum pin to alternately cause said latch to coact with said strut retainer when the lever swings said wheel into ground engagement and to cause the same latch to coact with said trailer tongue retainer when the strut and wheel are elevated.

3. In a jack and mobile supoprt for a trailer having a draft tongue provided with a coupling member detachably attachable to another coupling member carried by a hauling vehicle, a bracket formed for attachment to the trailer draft tongue, an elongated strut slidable up and down within said bracket, clamp means for locking said strut to said bracket, a lever having a fulcrum coacting with a lower portion of said strut and being provided near one end with a ground engaging wheel and near its opposite end with a latch, a latch retainer carried by said strut, and another latch retainer carried by the trailer tongue remote from said bracket, said lever being alternately swingable about its fulcrum to cause said latch to coact with said strut retainer when the lever swings said wheel into ground engagement so as to separate the coupling members, and to cause the same latch to coact with said trailer tongue retainer when the strut and wheel are inactive.

4. In a jack and mobile support for a trailer having a tongue provided with a socket coupling member detachably attachable to a ball coupling member carried by a hauling vehicle, a bracket cooperable with the trailer tongue, an elongated strut slidable up and down within said bracket, clamp means for locking said strut to said bracket, a lever having a fulcrum pivot suspended from a lower portion of said strut and being provided near one end with a ground engageable wheel and near its opposite end with a latch, and a latch retainer carried by said strut, both said wheel and said lever end being engageable with the ground on opposite sides of said strut when the strut is lowered and said lever being swingable thereafter about its fulcrum pivot to cause said wheel to engage the ground and lift the trailer tongue and socket member away from the ball member, and said latch being cooperable with said retainer to hold the trailer tongue and socket member in lifted position.

5. In a jack and mobile support for a trailer having a tongue provided with a socket coupling member detachably attachable to a ball coupling member carried by a hauling vehicle, a bracket cooperable with the trailer tongue, an elongated strut slidable up and down within said bracket, clamp means for locking said strut to said bracket, a lever having a fulcrum pivot coacting with a lower portion of said strut and being provided near one end with a ground engageable wheel and near its opposite end with a latch, and a latch retainer carried by the trailer tongue remote from said bracket, both said wheel and said lever end being engageable with the ground on opposite sides of said strut when the strut is lowered and, said lever being swingable about its fulcrum pivot when said strut is elevated to cause said latch to engage said retainer and to hold said wheel and lever in close proximity to the trailer tongue while the socket member engages the ball member.

6. In a jack and mobile support for a trailer having a tongue provided with a coupling member detachably attachable to another coupling member carried by a hauling vehicle, a bracket mountable upon the trailer tongue, an elongated strut rotatable and longitudinally slidable up and down within said bracket, means for clamping said strut to said bracket in either lowered or elevated position, a lever having a fulcrum coacting with a lower portion of said strut and being provided near one end with a caster wheel and near its opposite end with a latch, and separate latch retainers carried by an upper portion of said strut and by the trailer remote from said bracket, said lever being swingable about its fulcrum to alternately cause said latch to coact with said strut retainer when said strut is lowered and clamped and the lever swings said wheel into ground engagement, and to cause the same latch to coact with said trailer mounted retainer when said strut is elevated and clamped and the strut and wheel are elevated.

7. In a jack and mobile support for a trailer having a tongue provided with a socket coupling member detachably attachable to a ball coupling member carried by a hauling vehicle, a bracket cooperable with the trailer tongue, an elongated strut movable up and down within said bracket, a clamp for holding said strut in various positions relative to said bracket, a lever suspended from a lower portion of said strut and being provided near one end with a ground engageable wheel and near its opposite end with a latch, a retainer carried by the trailer tongue remote from said bracket and being cooperable with said latch to hold said lever parallel to the trailer tongue while the socket member actively engages the ball member, and another retainer carried by said strut and being cooperable with said same latch to hold said lever in upright position when the coupling members have been disconnected.

8. In a jack and mobile support for a trailer having a tongue provided with a socket coupling member detachably attachable to a ball coupling member carried by a hauling vehicle, a bracket cooperable with the trailer tongue, an elongated strut slidable up and down within said bracket, a clamp for holding said strut in various positions, a lever swingably suspended from a lower portion of said strut and having one end provided with a ground engageable element and near its opposite end with a latch, a latch retainer carried by the trailer tongue remote from said bracket and being cooperable with said latch, and another latch retainer carried by the end of said strut remote from said lever and being alternately cooperable with the same latch.

9. In a jack and mobile support for a trailer having a tongue provided with a coupling member detachably attachable to another coupling member carried by a hauling vehicle, a bracket mountable upon the trailer tongue, an elongated strut longitudinally movable relative to said bracket, means for clamping said strut to said bracket in various positions, a lever swingably suspended from a lower portion of said strut and being provided near one end with a ground engaging element and near its opposite end with a latch, and independent latch retainers carried by an upper portion of said strut and by the trailer remote from said bracket, said lever being swingable about its fulcrum to alternately cause said same latch to coact with said strut retainer and with said trailer supported retainer.

10. In a jack and mobile support for a trailer having a tongue provided with a socket coupling member detachably attachable to a ball coupling member carried by a hauling vehicle, a bracket mountable upon the trailer tongue, an elongated strut longitudinally slidable up and down along said bracket, means for clamping said strut to said bracket in either lowered or elevated position, and a lever having a fulcrum coacting with a lower portion of said strut and being provided near one end with a ground engaging element and near its opposite end with a handle, said lever being swingable about its fulcrum into upright position to cause said element to lift the socket coupling off of the ball coupling member when said handle is raised and into horizontal position with both said element and said opposite handle end in engagement with the ground when said strut is lowered.

References Cited in the file of this patent

UNITED STATES PATENTS

| 2,159,395 | Mersereau | May 23, 1939 |

FOREIGN PATENTS

| 13,290 | Great Britain | May 30, 1914 |
| 21,660 | Great Britain | Sept. 24, 1912 |